US012780312B2

(12) United States Patent
Ogahara et al.

(10) Patent No.: US 12,780,312 B2
(45) Date of Patent: Nov. 3, 2026

(54) DRIVING ASSISTANCE DEVICE

(71) Applicant: HONDA MOTOR CO., LTD., Tokyo (JP)

(72) Inventors: Atsushi Ogahara, Tokyo (JP); Tsubasa Nose, Tokyo (JP); Masaki Nakagawara, Tokyo (JP); Kiyotaka Sakai, Tokyo (JP); Hiroshi Maeda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/129,503

(22) PCT Filed: Nov. 21, 2023

(86) PCT No.: PCT/JP2023/041774
§ 371 (c)(1),
(2) Date: May 13, 2025

(87) PCT Pub. No.: WO2024/127928
PCT Pub. Date: Jun. 20, 2024

(65) Prior Publication Data
US 2026/0192854 A1 Jul. 9, 2026

(30) Foreign Application Priority Data
Dec. 16, 2022 (JP) ................................ 2022-201227

(51) Int. Cl.
*B62D 15/02* (2006.01)
*B60W 30/12* (2020.01)

(52) U.S. Cl.
CPC .......... *B62D 15/025* (2013.01); *B60W 30/12* (2013.01); *B60W 2300/36* (2013.01); *B60W 2552/30* (2020.02); *B60Y 2200/12* (2013.01)

(58) Field of Classification Search
CPC .......... B60K 28/00–165; B60Y 2200/12–134; B60W 30/10; B60W 30/12;
(Continued)

(56) References Cited

U.S. PATENT DOCUMENTS 9,550,526 B2 * 1/2017 You ..................... B62D 15/025
11,718,294 B2 * 8/2023 Omikawa ............ B60W 30/12 701/41

(Continued)

FOREIGN PATENT DOCUMENTS

JP 2017-095089 A 6/2017
JP 2023-175515 A 12/2023

(Continued)

OTHER PUBLICATIONS

International Search Report Corresponding to International Application No. PCT/JP2023/041774, dated Feb. 13, 2024, 4 pages.

(Continued)

*Primary Examiner* — Mark L. Greene
(74) *Attorney, Agent, or Firm* — Rankin, Hill & Clark LLP

(57) ABSTRACT

A driving assistance device includes a surrounding situation recognizing portion that recognizes a surrounding situation of the saddle-type vehicle, a driving condition recognizing portion that recognizes a driving condition of the saddle-type vehicle, and a control portion. When the saddle-type vehicle is recognized as traveling along a curved road, the control portion determines whether a predicted travel path of the saddle-type vehicle departs from a lane of interest of the saddle-type vehicle, the predicted travel path being based on the driving condition, the lane of interest being recognized from the surrounding situation. When the predicted travel path departs from the lane of interest, the control portion sets a target passage point corresponding to a curvature of the (Continued)

curved road, wherein the target passage point is in a direction of travel of the saddle-type vehicle within the lane of interest, and perform steering assist control based on the target passage point.

2 Claims, 6 Drawing Sheets

(58) Field of Classification Search
CPC . B60W 2300/36–367; B60W 2552/00; B60W 2552/05; B60W 2552/30; B62D 15/025; G05D 1/0061; G05D 1/0088; G05D 1/021; G05D 1/0214; G05D 1/0221; G05D 1/0223
See application file for complete search history.

(56) References Cited

U.S. PATENT DOCUMENTS

| | | | |
|---|---|---|---|
| 2022/0126690 | A1 | 4/2022 | Maeda et al. |
| 2022/0161788 | A1 | 5/2022 | Tamashima et al. |

FOREIGN PATENT DOCUMENTS

| | | | |
|---|---|---|---|
| WO | 2020/194694 | A1 | 10/2020 |
| WO | 2020/202266 | A1 | 10/2020 |

OTHER PUBLICATIONS

Written Opinion of the International Searching Authority Corresponding to International Application No. PCT/JP2023/041774, dated Feb. 13, 2024, 3 pages.
Japanese Office Action dated Oct. 7, 2025 issued in corresponding Japanese application No. 2022-201227; English machine translation included (5 pages).
English translation of the International Preliminary Report on Patentability dated Jun. 26, 2025 issued in corresponding International application No. PCT/JP2023/041774; 5 pages.

* cited by examiner

DRIVING ASSISTANCE DEVICE

TECHNICAL FIELD

The present invention relates to a driving assistance device.

BACKGROUND ART

Conventional driving assistance devices for saddle-type vehicles perform control that operates the steering device of the saddle-type vehicle so that the vehicle travels within a driving lane recognized from an image captured by a camera (see Patent Literature 1, for example). In Patent Literature 1, when the saddle-type vehicle travels along a curve (a curved road), the steering device is controlled to operate at points in time before the vehicle enters the curve, while the vehicle travels in the curve, and after the vehicle exits the curve so that the saddle-type vehicle travels within a lane along a travel path that goes from an outer part, to a center part, and then to the outer part of the lane.

CITATION LIST

Patent Literature

[Patent Literature 1]
International Publication WO 2020/202266

SUMMARY OF INVENTION

Technical Problem

The conventional driving assistance device described above switches steering control more than once when the saddle-type vehicle travels along a curved road, causing the rider of the saddle-type vehicle to feel a difference from the rider's expectation.

The present invention has been achieved in view of the background described above, and has an object of providing a driving assistance device that can perform steering assist control and inhibit a rider of a saddle-type vehicle from feeling a difference from the rider's expectation when the saddle-type vehicle travels along a curved road.

Solution to Problem

Japanese Patent Application No. 2022-201227 filed on Dec. 16, 2022 is incorporated herein in its entirety.

In an aspect for achieving the object described above, there is a driving assistance device that assists in steering of a saddle-type vehicle (1), the driving assistance device including: a surrounding situation recognizing portion (21) configured to recognize a surrounding situation of the saddle-type vehicle; a driving condition recognizing portion (22) configured to recognize a driving condition of the saddle-type vehicle; and a control portion (23) configured to, when the saddle-type vehicle is recognized, from the surrounding situation, as being traveling along a curved road, determine whether a predicted travel path of the saddle-type vehicle departs from a lane of interest of the saddle-type vehicle, the predicted travel path being based on the driving condition, the lane of interest being recognized from the surrounding situation, and when the predicted travel path departs from the lane of interest, set a target passage point corresponding to a curvature of the curved road, the target passage point being in a direction of travel of the saddle-type vehicle within the lane of interest, and perform steering assist control that operates a steering device (42) included in the saddle-type vehicle based on the target passage point.

Advantageous Effects of Invention

The driving assistance device described above can perform steering assist control and inhibit a rider of a saddle-type vehicle from feeling a difference from the rider's expectation when the saddle-type vehicle travels along a curved road.

DESCRIPTION OF EMBODIMENTS

1. Configuration of Driving Assistance Device

Figure 1:
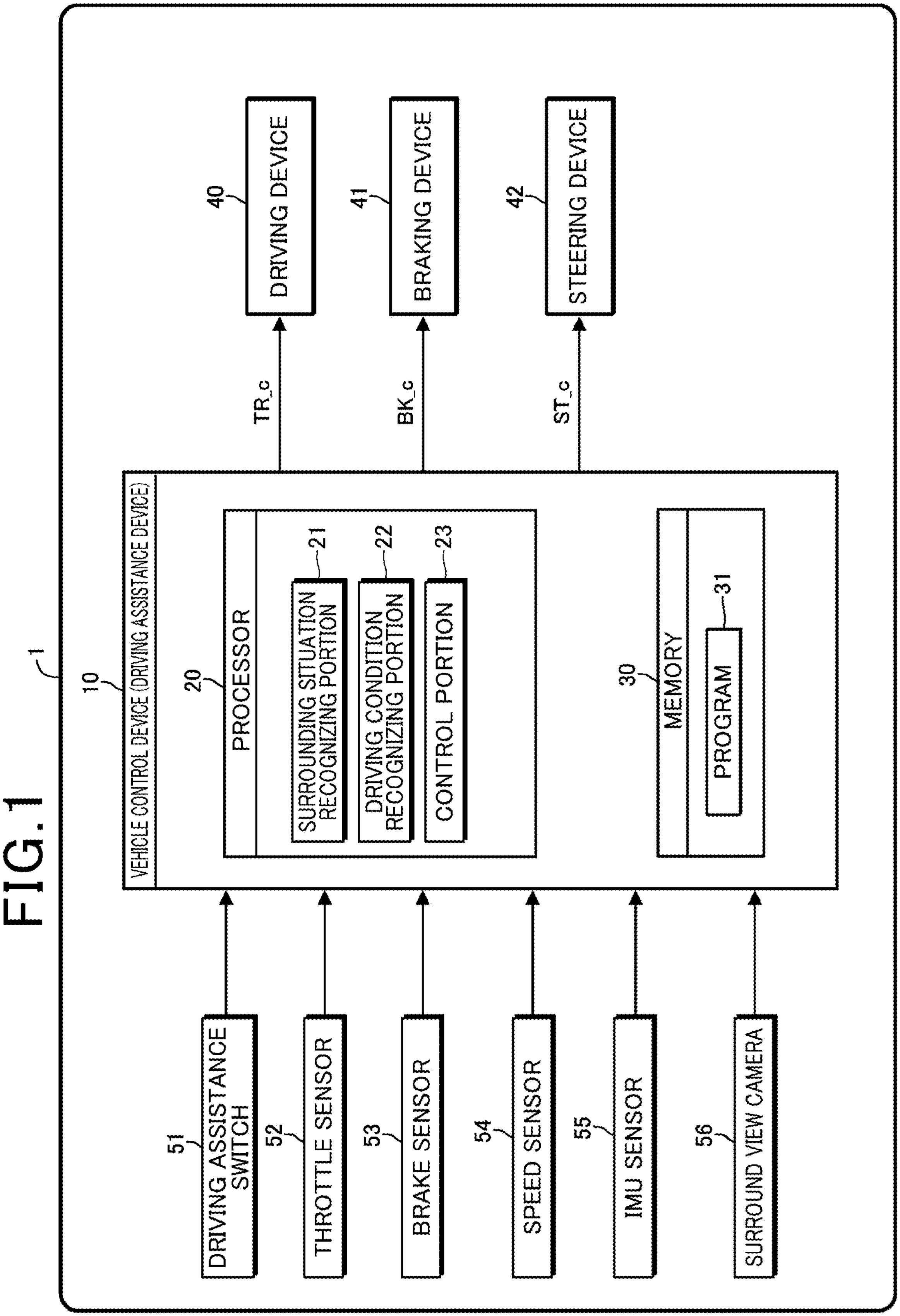
FIG. 1 is a configuration diagram of a driving assistance device and a saddle-type vehicle including the driving assistance device.

With reference to FIG. 1, a configuration of a driving assistance device according to the present disclosure is described. The driving assistance device according to the present disclosure is configured as part of the function of a vehicle control device 10 that is included in a vehicle 1 and controls the overall operation of the vehicle 1. The vehicle 1 is a saddle-type vehicle that a rider rides by straddling a vehicle body. The vehicle 1 encompasses, besides motorcycles, three-wheeled vehicles (having one front wheel and two rear wheels, or having two front wheels and one rear wheel) categorized as ATVs (all-terrain vehicles) and four-wheeled vehicles.

The vehicle 1 includes: a driving assistance switch 51 that turns ON/OFF a driving assistance function, such as steering assist control to be described below; a throttle sensor 52 that detects a level of manipulation performed for a throttle through an accelerating manipulation portion (such as an accelerator grip); a brake sensor 53 that detects a level of manipulation performed for a brake through a braking manipulation portion (such as a brake lever and a brake pedal); a speed sensor 54 that detects a traveling speed of the vehicle 1; an IMU (Inertial Measurement Unit) sensor 55; and a surround view camera 56 that captures an image of the surroundings of the vehicle 1. The IMU sensor 55 detects an angular velocity and an acceleration of the vehicle 1 by using a three-orthogonal-axis gyro sensor and an acceleration sensor.

The vehicle control device 10 receives: a manipulation signal from the driving assistance switch 51; detection signals from the throttle sensor 52, the brake sensor 53, the speed sensor 54, and the IMU sensor 55; and a captured image from the surround view camera 56.

The vehicle 1 further includes a driving device 40, a braking device 41, and a steering device 42. Operations of the driving device 40, the braking device 41, and the steering device 42 are controlled through respective control signals TR_c, BK_c, and ST_c output from the vehicle control device 10.

The vehicle control device 10 is a control unit that includes a processor 20 and a memory 30. The memory 30 has stored therein a program 31 for the control of the vehicle control device 10. The processor 20 functions as a surrounding situation recognizing portion 21, a driving condition recognizing portion 22, and a control portion 23 by reading and executing the program 31.

The surrounding situation recognizing portion 21 recognizes a lane in which the vehicle 1 is traveling (lane of interest), as a surrounding situation of the vehicle 1, based on an image captured by the surround view camera 56. The surrounding situation recognizing portion 21 recognizes the position of the lane of interest (the positions of a left boundary line and a right boundary line) with respect to the vehicle 1. The driving condition recognizing portion 22 recognizes a driving condition of the vehicle 1 based on detection signals from the speed sensor 54 and the IMU sensor 55. The control portion 23, when in a driving assistance mode, which is started by turning ON the driving assistance switch 51, performs the steering assist control, which operates the steering device 42 to allow the vehicle 1 to avoid departing from the lane of interest recognized by the surrounding situation recognizing portion 21.

2. Steering Assist Control

Following a flowchart shown in FIG. 2 and referring to FIGS. 3 to 6, the steering assist control, which is performed by the vehicle control device 10 when the vehicle 1 is traveling along a curved road (a curve), is described below.

Figure 2:
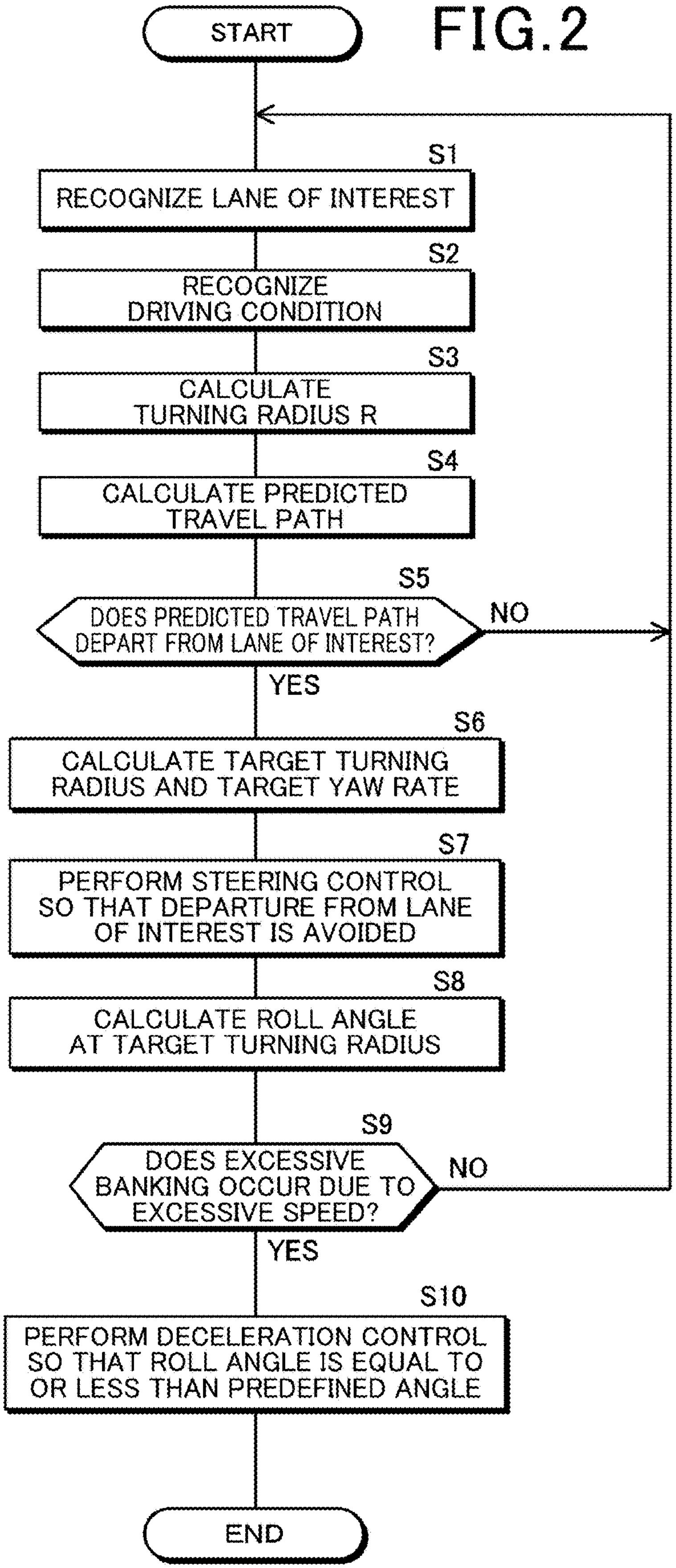
FIG. 2 is a flowchart for steering assist control performed by a driving assistance device.
Figure 3:
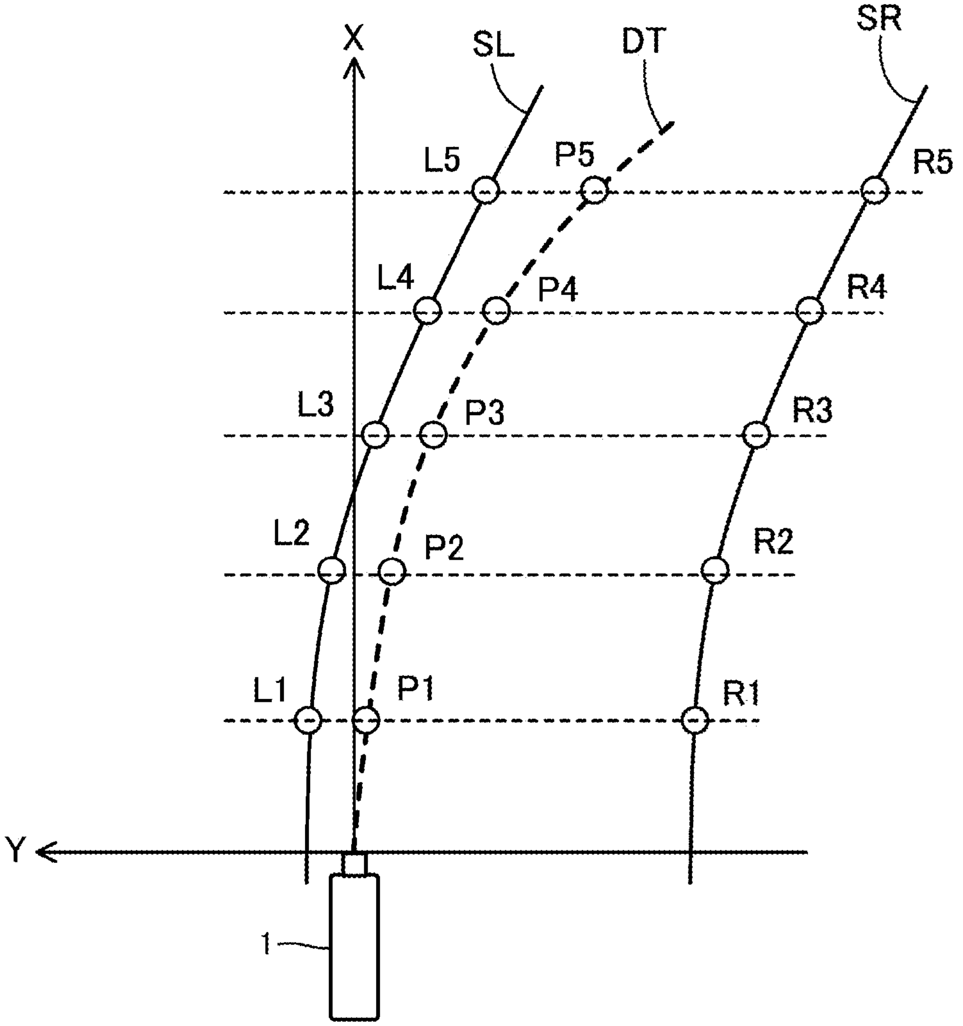
FIG. 3 is a diagram for describing a recognized aspect of a travel path of the saddle-type vehicle with respect to a lane of interest.

In FIG. 2, at step S1, the surrounding situation recognizing portion 21 recognizes a boundary line of a lane of interest in which the vehicle 1 is traveling from an image captured by the surround view camera 56. FIG. 3 shows a recognized situation of a left boundary line SL and a right boundary line SR of the lane of interest as recognized by the surrounding situation recognizing portion 21, where Y represents a lane width direction of the lane of interest and X represents a direction of travel of the vehicle 1.

At subsequent step S2, the driving condition recognizing portion 22 recognizes a speed of the vehicle 1 based on a detection signal from the speed sensor 54, and recognizes a yaw rate, a pitch rate, and a roll angle of the vehicle 1 based on a detection signal from the IMU sensor 55. At subsequent step S3, the control portion 23 calculates a turning radius of the vehicle 1 using an expression (1) and an expression (2) shown below.

[Expression 1]

$$\omega = (\omega y \times \sin\varphi + \omega z \times \cos\varphi) \times \frac{2\pi}{360} \tag{1}$$

where ω represents a yaw rate (deg/s) of the vehicle 1 with respect to a horizontal plane; ωy represents a pitch rate (deg/s) of the vehicle 1; ωz represents a yaw rate (deg/s) of the vehicle 1; and ϕ represents a roll angle (deg) of the vehicle 1.

[Expression 2]

$$R = \frac{V}{\omega} \tag{2}$$

where R represents the turning radius of the vehicle 1; V represents the speed of the vehicle 1; and ω represents the yaw rate of the vehicle 1 with respect to the horizontal plane.

At subsequent step S4, the control portion 23 calculates a predicted travel path DT of the vehicle 1 corresponding to the turning radius R as shown in FIG. 3. At subsequent step S5, the control portion 23 determines whether the predicted travel path DT departs from the lane of interest. Specifically, the control portion 23 determines whether the predicted travel path DT departs from the lane of interest by checking whether passage points P1, P2, and through P5 of the predicted travel path DT at respective passage lines L1-R1, L2-R2, and through L5-R5 in a direction of travel along the lane of interest are located on a left side of the left boundary line SL or on a right side of the right boundary line SR (outside of the lane of interest).

Figure 4:
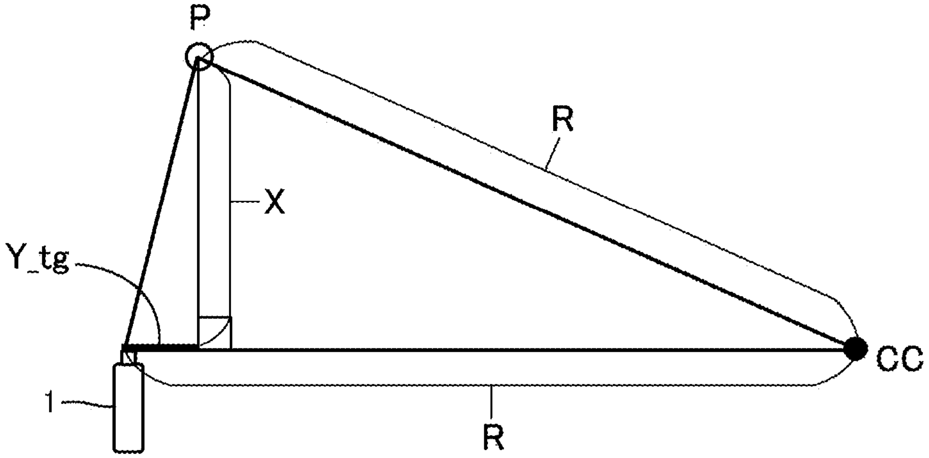
FIG. 4 is a diagram for describing calculation processing for a turning radius of the saddle-type vehicle.

FIG. 4 shows a method for calculating a distance Y_tg in the lane width direction from the vehicle 1 to a passage point P, where the passage point P is located away from the vehicle 1 by X in the direction of travel of the vehicle 1. In FIG. 4, CC represents a center of turning of the vehicle 1, and R represents the turning radius. From the relationship shown in FIG. 4, Y_tg can be calculated by using an expression (3) shown below.

[Expression 3]

$$Y\_tg = R - \sqrt{R^2 - X^2} \tag{3}$$

where Y_tg represents the distance in the lane width direction from the vehicle 1 to the passage point P; R represents the turning radius of the vehicle 1; and X represents a distance in the direction of travel of the vehicle 1 from the vehicle 1 to the passage point P.

Consider that a lateral left direction of the vehicle 1 is positive and a lateral right direction of the vehicle 1 is negative. When the vehicle 1 is making a left turn, the position of the passage point P in the lane width direction is the position of the vehicle 1 plus Y_tg. When the vehicle 1 is making a right turn, the position of the passage point P in the vehicle width direction is the position of the vehicle 1 minus Y_tg.

The control portion 23 determines that the passage point P departs from the lane of interest if the position of the passage point P in the vehicle width direction falls on the right side of a corresponding point on the right boundary line SR, or if the position of the passage point P in the vehicle width direction falls on the left side of the left boundary line SL. For instance, in an example in FIG. 3, if the position of the passage point P5 in a Y-direction is on the right side of R5 (if the Y coordinate value for P5 is smaller than the Y coordinate value for R5), or if the position of the passage point P5 in the Y-direction is on the left side of L5 (if the Y coordinate value for P5 is greater than the Y coordinate value for L5), the control portion 23 determines that the passage point P5 departs from the lane of interest.

If the control portion 23 determines that any passage point departs from the lane of interest, the control portion 23 determines that the predicted travel path DT of the vehicle 1 departs from the lane of interest and processing proceeds from step S5 to step S6. If the control portion 23 determines that all passage points are within the lane of interest, the control portion 23 determines that the predicted travel path of the vehicle 1 does not depart from the lane of interest, and the processing proceeds from step S5 to step S1.

Figure 5:
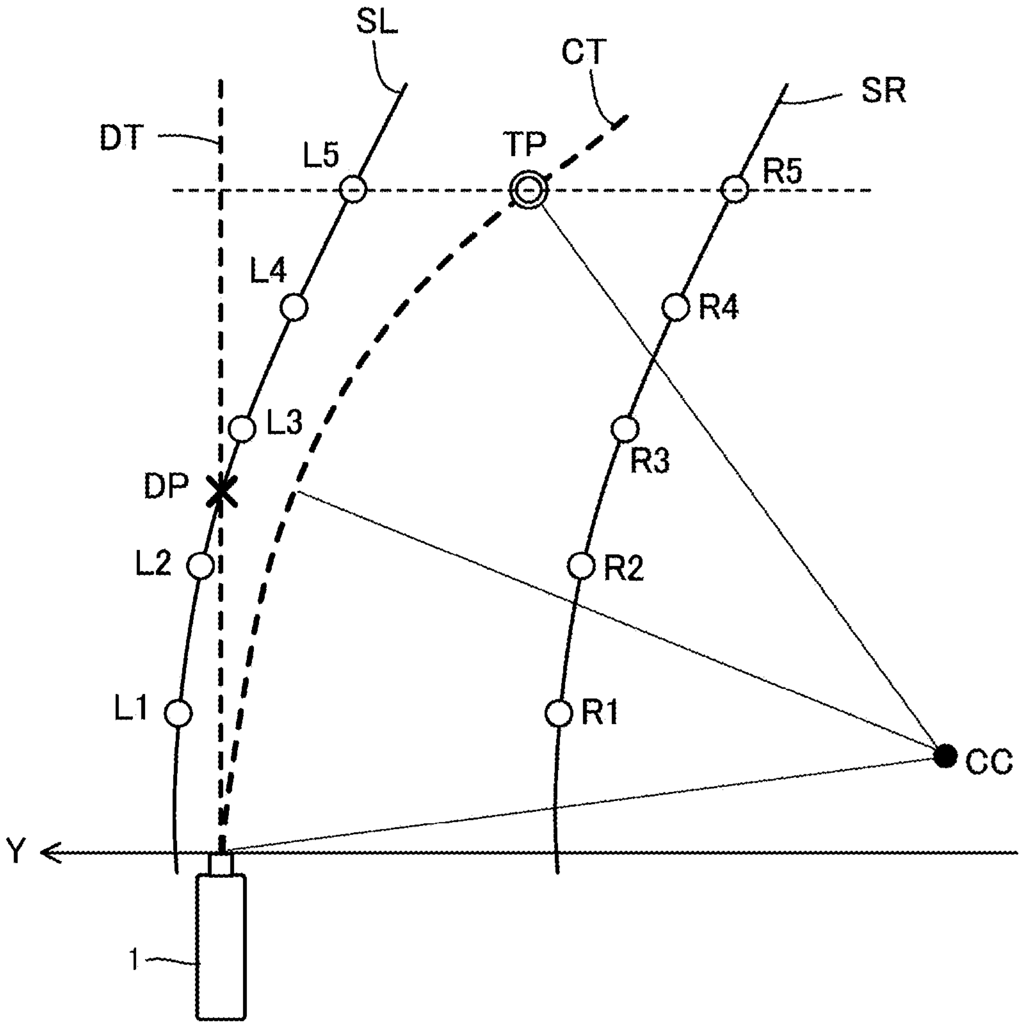
FIG. 5 is a diagram for describing a setting aspect of a target passage point.

At step S6, the control portion 23 calculates a target turning radius and a target yaw rate that bring the predicted travel path of the vehicle 1 into the lane of interest. FIG. 5 shows an example situation in which the predicted travel path DT of the vehicle 1 departs from the lane of interest at an out-of-path point DP. In this case, the control portion 23 sets a target passage point TP on the line L5-R5, which is the farthest away from the vehicle 1. The control portion 23 normally sets a midpoint between LR and R5 on the line LR-R5 as the target passage point TP; but in correspondence to a situation, such as a curvature of the lane of interest, recognized by the surrounding situation recognizing portion 21, the control portion 23 sets the position of the target passage point by using one of a first pattern to a fourth pattern described below.

The first pattern: the lane of interest curves to the right and the turning radius R is small (a large curvature), (a tight corner having, for example, a radius equal to or smaller than 300 m).

In this case, the target passage point TP is shifted toward the right boundary line SR. For example, the position of the target passage point TP in the Y-direction Y_TP is calculated using an expression (4) described below.

[Expression 4]

$$Y\_TP = (Y\_L5 - Y\_R5) \times 0.25 + Y\_R5 \quad (4)$$

where Y_TP represents the position of the target passage point TP in the Y-direction (Y coordinate position); Y_L5 represents the position of L5 in the Y-direction (Y coordinate position); T_R5 represents the position of R5 in the Y-direction (Y coordinate position); and 0.25 is an adjustment factor. If the adjustment factor is set to 0.5, Y_TP is at a middle between Y_L5 and Y R5, and if the adjustment factor is set to be greater than 0.5, Y_TP is shifted toward Y_L5.

The second pattern: the lane of interest curves to the left and the turning radius R is small (a large curvature).

In this case, the adjustment factor in the expression (4) is set to 0.75, so that the target passage point TP is shifted toward the left boundary line SL.

The third pattern: the lane of interest is straight and the vehicle 1 is approaching the left boundary line SL.

In this case, the adjustment factor in the expression (4) is set to 0.75, so that the target passage point TP is shifted toward the right boundary line SR.

The fourth pattern: the lane of interest is straight and the vehicle 1 is approaching the right boundary line SR.

In this case, the adjustment factor in the expression (4) is set to 0.25, so that the target passage point TP is shifted toward the left boundary line SL.

Furthermore, the adjustment factor in the expression (4) may be varied linearly in correspondence to the condition of the curvature or straightness of the lane of interest. By varying the adjustment factor, the degree of the intervention of the steering control for inhibiting a departure from the lane can be changed. For example, by setting the target passage point TP at a position where the distance from the target passage point TP to the boundary line that is the closer to the center of turning decreases as the curvature of the lane of interest (the curvature of the curved road) increases, assistance can be provided to steer the vehicle 1 to a great degree. By setting the target passage point TP at a position where the distance from the target passage point TP to the boundary line that is the closer to the center of turning increases as the curvature of the lane of interest decreases, the steering of the vehicle 1 can be assisted while an excessive degree of steering is inhibited. Furthermore, by setting a point close to the vehicle 1 in distance in the Y-direction as the target passage point, the intervention of the steering assist control can be reduced.

The control portion 23 calculates a target turning radius R_tg from the target passage point TP that has been set. From the relationship between the target passage point TP and the turning radius R of the vehicle 1 shown FIG. 4, an expression (5) shown below holds.

[Expression 5]

$$R\_tg^2 = X^2 + (R\_tg - Y\_tg)^2 \quad (5)$$

where R_tg represents the target turning radius; X represents a distance in the direction of travel of the vehicle 1 between the vehicle 1 and the target passage point TP; and Y_tg represents a distance in the lane width direction of the lane of interest between the vehicle 1 and the target passage point TP.

The target turning radius R_tg can be calculated by using an expression (6) shown below, which is a transformation of the expression (5).

[Expression 6]

$$R\_tg = \frac{X^2 + Y\_tg^2}{2 \times Y\_tg} \quad (6)$$

The control portion 23 calculates a target yaw rate ω_tg using an expression (7) shown below.

[Expression 7]

$$\omega\_tg = \frac{V}{R\_tg} \quad (7)$$

where ω_tg represents the target yaw rate; V represents the speed of the vehicle 1; and R_tg represents the target turning radius.

At step S7, the control portion 23 determines the control signal ST_c for the steering device 42 and the control signal TR_c for the driving device 40 so that the vehicle 1 travels along a predicted travel path corresponding to the target turning radius R_tg at the target yaw rate ω_tg, and outputs the determined control signals ST_c and TR_c to the steering device 42 and the driving device 40, respectively.

Figure 6:
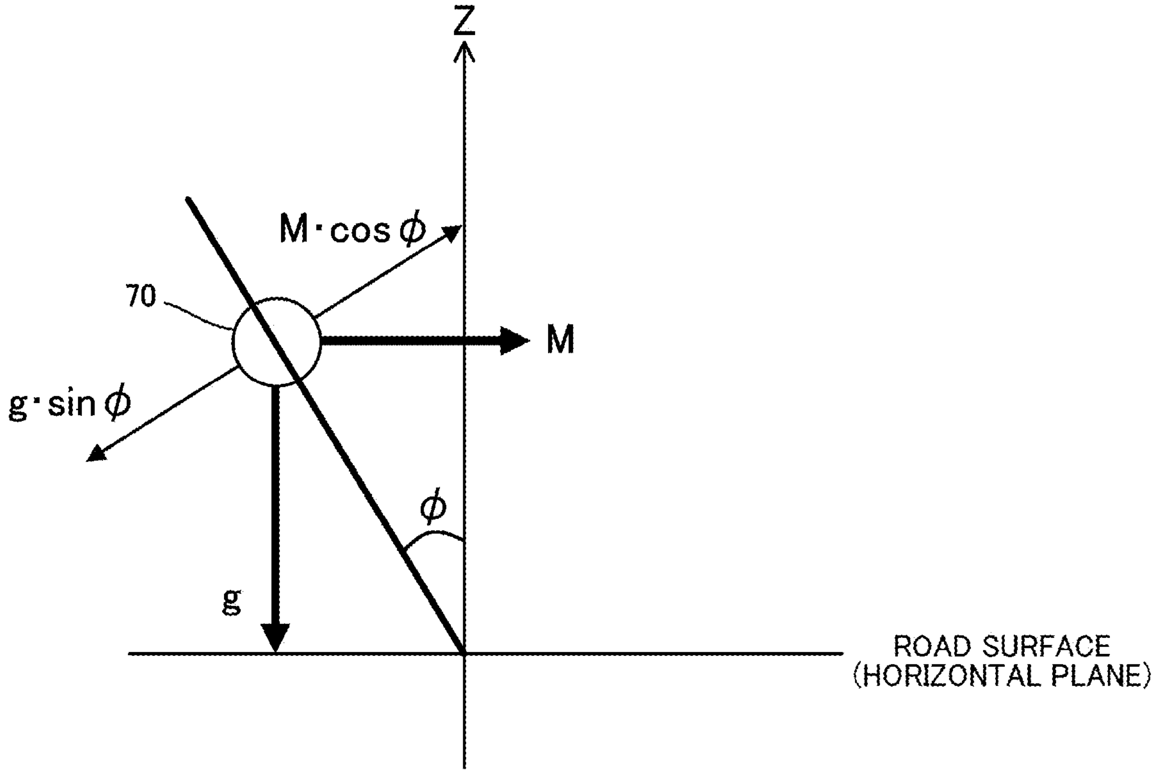
FIG. 6 is a diagram for describing calculation processing for a roll angle of the saddle-type vehicle.

At subsequent step S8, the control portion 23 calculates the roll angle of the vehicle 1 occurring when the vehicle 1 travels at the target turning radius R_tg by using an expression (8) shown below. FIG. 6 shows a state in which the vehicle 1 is rolling, where the roll angle ϕ, a centrifugal acceleration M, and a gravitational acceleration g of the vehicle 1 are shown with respect to a center of gravity 70 of the vehicle 1 with Z representing a vertical direction. The centrifugal acceleration M can be calculated using the expression (8) shown below.

[Expression 8]

$$M = \frac{V^2}{|R|} \tag{8}$$

where M represents the centrifugal acceleration; V represents the speed of the vehicle 1; and R represents the turning radius of the vehicle 1.

In a state in which the vehicle 1 is banking stably, an expression (9), which is an approximate expression, holds as an expression expressing the balance in a vehicle body lateral direction. Thus, the roll angle ϕ can be calculated using an expression (10) shown below.

[Expression 9]

$$g \times \sin\varphi \approx M \times \cos\varphi \tag{9}$$

where ϕ represents the roll angle; g represents the center of gravity acceleration; and M represents the centrifugal acceleration.

[Expression 10]

$$\varphi = \tan^{-1}\frac{M}{g} \tag{10}$$

At subsequent step S9, the control portion 23 determines whether the roll angle ϕ is greater than a predefined angle (20 degrees, for example) and thus whether an excessive speed results in excessive banking. If excessive banking occurs, the control portion 23 proceeds to step S10. If excessive banking does not occur, the control portion 23 proceeds to step S1.

At step S10, the control portion 23 determines the control signal BK_c for the braking device 41 so that the roll angle ϕ is equal to or less than the predefined angle and outputs the determined control signal BK_c to the braking device 41 to perform deceleration control for the vehicle 1. The control portion 23 repeats the steering assist control according to the flowchart shown in FIG. 2, and if the yaw rate of the vehicle 1 with respect to the horizontal plane converges to the target yaw rate ω_tg, the control portion 23 ends the steering assist control.

By performing the steering assist control according to the flowchart shown in FIG. 2, the vehicle 1 can be caused to travel with continuity within the target lane of interest along the turning radius. Thus, the rider of the vehicle 1 can be inhibited from feeling a difference from the rider's expectation due to frequent switching of the steering control.

3. Other Embodiments

While the control portion 23 performs the deceleration control at steps S8 to S10 in FIG. 2 to prevent excessive banking of the vehicle 1 in the embodiment described above, the processing of steps S8 to S10 may be omitted.

Note that FIG. 1 is a schematic diagram that shows a functional configuration of the driving assistance device in such a manner that divides the configuration according to main processing in order to facilitate understanding of the invention of the present disclosure. The functional configuration of the driving assistance device may be divided differently. Processing of each constituent element may be performed by one hardware unit or a plurality of hardware units. Processing of each constituent element of the driving assistance device shown in FIG. 2 may be performed by one program or a plurality of programs.

5. Configurations Supported by the Embodiments Described Above

The foregoing embodiments describe specific examples of the following configurations.

(First configuration) A driving assistance device that assists in steering of a saddle-type vehicle (1), the driving assistance device including: a surrounding situation recognizing portion (21) configured to recognize a surrounding situation of the saddle-type vehicle; a driving condition recognizing portion (22) configured to recognize a driving condition of the saddle-type vehicle; and a control portion (23) configured to, when the saddle-type vehicle is recognized, from the surrounding situation, as being traveling along a curved road, determine whether a predicted travel path of the saddle-type vehicle departs from a lane of interest of the saddle-type vehicle, the predicted travel path being based on the driving condition, the lane of interest being recognized from the surrounding situation, and when the predicted travel path departs from the lane of interest, set a target passage point corresponding to a curvature of the curved road, the target passage point being in a direction of travel of the saddle-type vehicle within the lane of interest, and perform steering assist control that operates a steering device (42) included in the saddle-type vehicle based on the target passage point.

In accordance with the driving assistance device of the first configuration, the steering assist control can be performed and inhibit a rider of the saddle-type vehicle from feeling a difference from the rider's expectation when the saddle-type vehicle travels along a curved road.

(Second configuration) The driving assistance device according to the first configuration, wherein the control portion sets the target passage point at a position where a distance from a center of turning of the saddle-type vehicle to the target passage point in a lane width direction of the lane of interest decreases as the curvature of the curved road increases.

In accordance with the driving assistance device of the second configuration, the saddle-type vehicle can be steered to a great degree by shifting the target passage spot toward the center of turning of the saddle-type vehicle in the lane width direction when a curved road has a large curvature (a tight curvature).

(Third configuration) The driving assistance device according to the first configuration or the second configuration, wherein the control portion sets the target passage point at a position where a distance from a center of turning of the saddle-type vehicle to the target passage point in a lane width direction of the lane of interest increases as the curvature of the curved road decreases.

In accordance with the driving assistance device of the third configuration, appropriate assistance in steering of the saddle-type vehicle can be provided with excessive steering inhibited, by shifting the target passage spot away from the center of turning of the saddle-type vehicle in the lane width direction when a curved road has a small curvature (a gentle curvature).

(Fourth configuration) The driving assistance device according to any one of the first configuration to the fourth configuration, wherein, when the control portion is performing the steering assist control and a yaw rate of the saddle-type vehicle with respect to a horizontal plane converges to a target yaw rate, the control portion ends the steering assist control, the yaw rate being recognized from the driving condition.

In accordance with the driving assistance device of the fourth configuration, the steering assist control can be inhibited from being performed repeatedly, and thus, it can be expected that a rider of the saddle-type vehicle will get a natural steering feel.

(Fifth configuration) The driving assistance device according to any one of the first configuration to the fourth configuration, wherein, when the control portion is performing the steering assist control and a roll angle of the saddle-type vehicle is equal to or greater than a predefined angle, the control portion operates a braking device included in the saddle-type vehicle, the roll angle being recognized from the driving condition.

In accordance with the driving assistance device of the fifth configuration, the roll angle of the saddle-type vehicle can be inhibited from being equal to or greater than the predefined angle and thus the saddle-type vehicle can be inhibited from banking excessively by operating the braking device to decelerate the saddle-type vehicle.

INDUSTRIAL APPLICABILITY

The driving assistance device according to the present disclosure can be used for the purpose of performing the steering assist control and inhibiting a rider of a saddle-type vehicle from feeling a difference from the rider's expectation when the saddle-type vehicle is traveling along a curved road.

REFERENCE SIGNS LIST

1 saddle-type vehicle, 10 vehicle control device (driving assistance device), 20 processor, 21 surrounding situation recognizing portion, 22 driving condition recognizing portion, 23 control portion, 30 memory, 31 program, 40 driving device, 41 braking device, 42 steering device, 51 driving assistance switch, 52 throttle sensor, 53 brake sensor, 54 speed sensor, 55 IMU sensor, 56 surround view camera

The invention claimed is:

1. A driving assistance device that assists in steering of a saddle-type vehicle, the driving assistance device comprising a processor that is configured to:

recognize a surrounding situation of the saddle-type vehicle;

recognize a driving condition of the saddle-type vehicle; and when the saddle-type vehicle is recognized, from the surrounding situation, as being traveling along a curved road, determine whether a predicted travel path of the saddle-type vehicle departs from a lane of interest of the saddle-type vehicle, the predicted travel path being based on the driving condition, the lane of interest being recognized from the surrounding situation, and when the predicted travel path departs from the lane of interest, set a target passage point corresponding to a curvature of the curved road, the target passage point being in a direction of travel of the saddle-type vehicle within the lane of interest, and perform steering assist control that operates a steering device included in the saddle-type vehicle based on the target passage point, wherein the processor is configured to set the target passage point at a position where a distance in a lane width direction of the lane of interest from the target passage point to a boundary line of the lane of interest closer to a center of turning of the saddle-type vehicle decreases as the curvature of the curved road increases.

2. A driving assistance device that assists in steering of a saddle-type vehicle, the driving assistance device comprising a processor that is configured to:

recognize a surrounding situation of the saddle-type vehicle;

recognize a driving condition of the saddle-type vehicle; and when the saddle-type vehicle is recognized, from the surrounding situation, as being traveling along a curved road, determine whether a predicted travel path of the saddle-type vehicle departs from a lane of interest of the saddle-type vehicle, the predicted travel path being based on the driving condition, the lane of interest being recognized from the surrounding situation, and when the predicted travel path departs from the lane of interest, set a target passage point corresponding to a curvature of the curved road, the target passage point being in a direction of travel of the saddle-type vehicle within the lane of interest, and perform steering assist control that operates a steering device included in the saddle-type vehicle based on the target passage point, wherein the processor is configured to set the target passage point at a position where a distance in a lane width direction of the lane of interest from the target passage point to a boundary line of the lane of interest closer to a center of turning of the saddle-type vehicle increases as the curvature of the curved road decreases.

* * * * *